Aug. 27, 1963 M. J. KLEIN 3,101,616
VOLUMETRIC POSITIVE DISPLACEMENT FLOW METER
Filed May 8, 1959 4 Sheets-Sheet 1
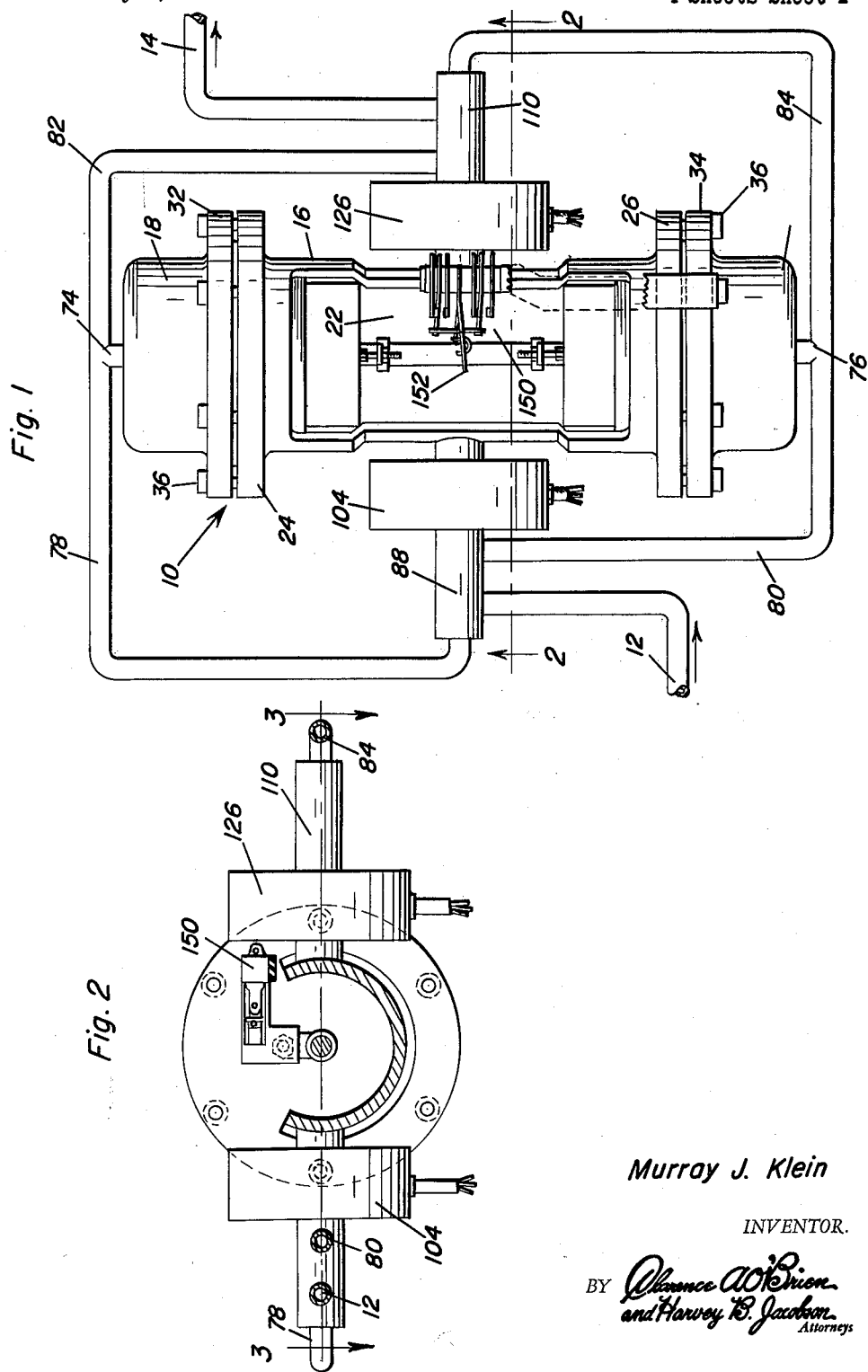
Murray J. Klein
INVENTOR.

Murray J. Klein
INVENTOR.

Aug. 27, 1963 M. J. KLEIN 3,101,616
VOLUMETRIC POSITIVE DISPLACEMENT FLOW METER
Filed May 8, 1959 4 Sheets-Sheet 3
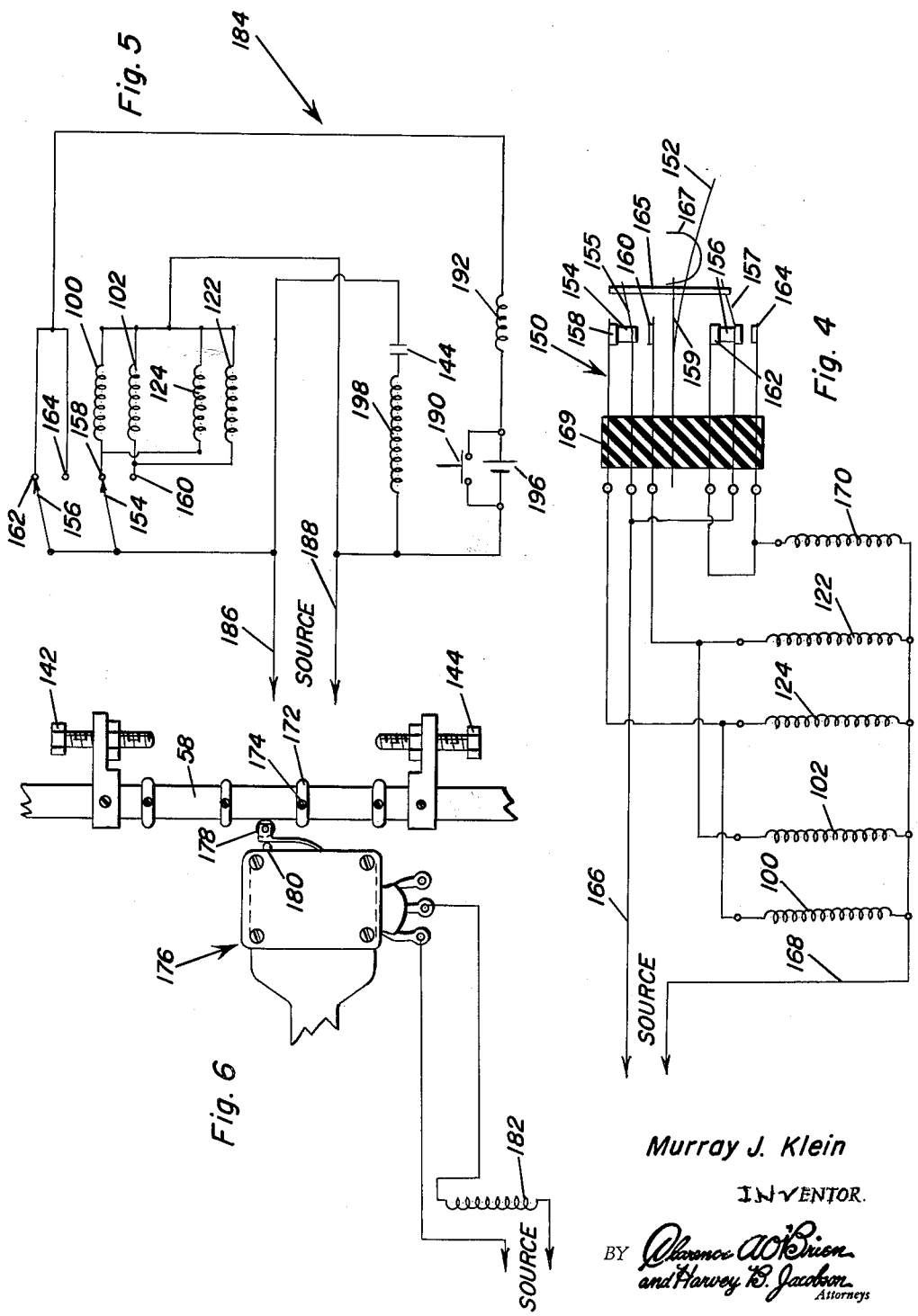
Murray J. Klein
INVENTOR.

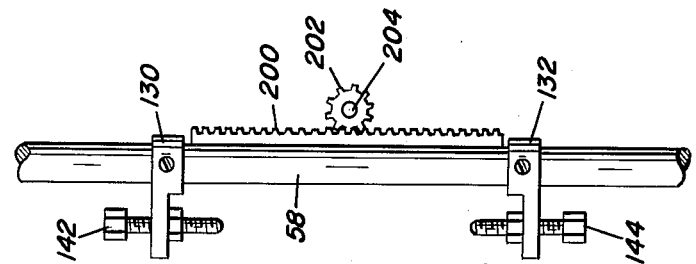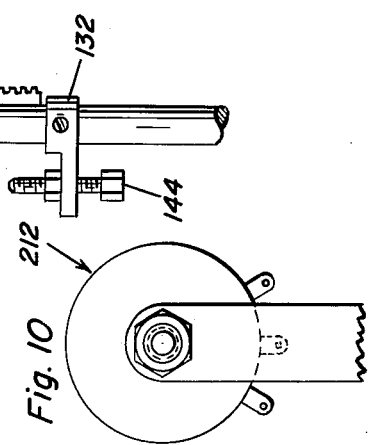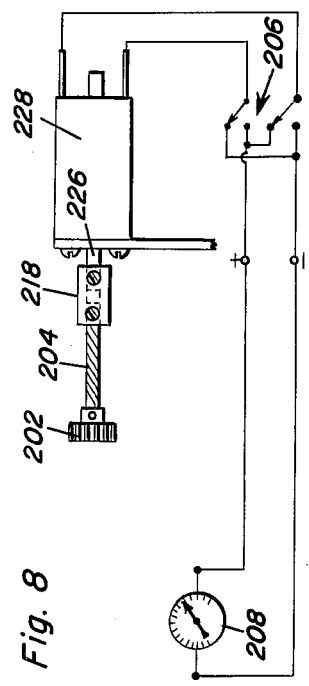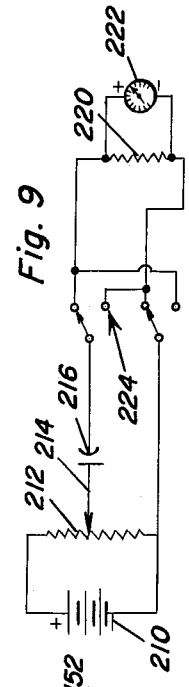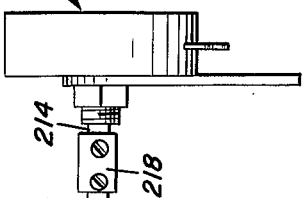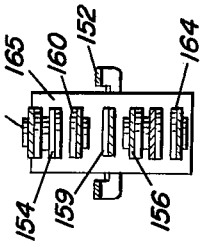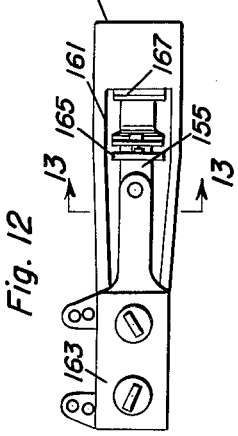

United States Patent Office 3,101,616
Patented Aug. 27, 1963

3,101,616
VOLUMETRIC POSITIVE DISPLACEMENT
FLOW METER
Murray J. Klein, 6 Bay Ave., Patchogue,
Long Island, N.Y.
Filed May 8, 1959, Ser. No. 812,003
14 Claims. (Cl. 73—263)

This invention relates generally to flow meters and more particularly to a positive displacement flow meter which may be utilized to measure or control liquid flow.

Flow meters of course find various uses throughout industry. Further, it is apparent that they may be utilized in conjunction with fuel systems, liquid dispensing machines, etc. Though many types of flow meters are well known to the prior art, most of them have significant disadvantages inasmuch as they are expensive, inaccurate at low rates of flow due to fluid by-pass around the pistons and valves and require a substantial pressure differential for their operation. The invention to be described below was developed for the purpose of providing a highly accurate means of measuring small rates of liquid flow. Further, the device lends itself to the measurement of large rates of flow by increasing various dimensions of the chambers and tubing. The device was specifically developed for the purpose of providing an inexpensive and accurate gasoline tank gauge which may be used on small pleasure crafts. The float-level type gauge, now generally utilized, is often inaccurate and its inaccuracy is further aggravated by the pitching and rolling of the vessel. The flow meter described below, when installed in the carburetor feed line, will not only inform the operator of the fuel level in the tank, but also, since it can be set to register small amounts of fuel consumption, it may be used as a flow rate meter. The latter feature may be very useful of course, since an operator may know well in advance how long he can safely run his vessel on the fuel remaining in the tank; determine his most economical cruising speed and helps in finding the throttle opening for the optimum relationship between speed of the vessel and the rate of fuel consumption.

A further apparent use of the novel flow meter construction forming the subject matter of this invention, is in conjunction with liquid dispensing machines. Numerous other uses of the flow meter will become apparent representing combinations in which the flow meter subcombination may be incorporated.

It is the principal object of this invention to provide a novel flow meter construction which may be utilized to accurately measure or control small amounts of liquid flow.

It is a further object of this invention to provide a novel flow meter construction which may be mounted in any position, the position not effecting the accuracy of the device. Also, the device would not be adversely effected by sudden jarring or movement thereof.

It is a still further object of this invention to provide a novel flow meter which may be easily incorporated within various measuring and control circuits for efficiently and reliably measuring and controlling liquid flow whereby only extremely low heads of pressure are available and to do so with a minimum of pressure drop.

It is a still further object of this invention to provide a novel flow meter construction which eliminates the undesirable inclusion of coil springs; the flow meter utilizing only positive movement.

It is a still further object of this invention to provide a novel flow meter construction which may be economically manufactured and sold and which is obviously reliable and durable.

It is a still further object of this invention to provide a novel flow meter construction which may be easily incorporated with various measuring and control circuits for efficiently and reliably measuring and controlling liquid flow.

In accordance with the above stated objects, the novel construction and various utilizations of the flow meter comprising this invention are hereafter particularly described. The flow meter includes a housing having a central portion and bonnet portion forming end walls for the housing. The central portion and bonnet portions are secured together by bolts passing through mating flanges. Rolling seal diaphragms having beaded ends are secured between the mating flanges and extend across the housing to form chambers between the end wall of the bonnet portion and the rolling seal diaphragm. The rolling seal diaphragm utilized is the type disclosed in U.S. Patent No. 2,849,026 issued on August 26, 1958. Pistons are fixed to each of the rolling seal diaphragms remote from the defined chambers. The pistons have a connecting rod disposed therebetween. A port is associated with each chamber and the inlet and discharge tubes communicate with each port. Valve means are provided to provide communication alternately, from an inlet tube of one chamber and a discharge tube of another chamber with the main inlet and discharge pipes. The valve means are positively controlled by electromagnetic coils which are energized by switch means actuated by adjustable bosses carried by the connecting rod. Various measuring and control circuits are provided to act in conjunction with the connecting rod.

Other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary elevational plan view of a flow system incorporating the flow meter comprising this invention;

FIGURE 2 is a sectional view taken substantially along the plane 2—2 of FIGURE 1;

FIGURE 4 is a schematic view showing the snap switch operated by the adjustable bosses carried by the connecting rod and illustrating the electromagnetic coils connected thereto for controlling the flow meter valve and also includes a metering or counting coil;

FIGURE 5 is a schematic view showing a control circuit which may be utilized with the flow meter to dispense a predetermined quantity of liquid;

FIGURE 6 is an enlarged fragmentary elevational view illustrating alternative counting means for special application in order to adapt the flow meter for utilization with conventional counters;

FIGURE 7 is an enlarged fragmentary elevational view illustrating structural relationships for utilizing the movement of the connecting rod for metering;

FIGURE 8 is a representative illustration of indicating system which may be used with the means of FIGURE 7 for generating a voltage by the reciprocal movement of the connecting rod to indicate, for example, gallons per hour when utilized with a fuel flow system.

FIGURE 9 is a representative illustration of an indicating system which may be used with the means of FIGURE 7 for moving the wiper arm of a potentiometer to control the current through a capacitor for indicating gallons per hour when utilized in a fuel flow system;

FIGURE 10 is a front fragmentary elevational view illustrating a conventional potentiometer which may be controlled by the means of FIGURE 7 and utilized with the system of FIGURE 9;

FIGURE 11 is a side fragmentary elevational view of the potentiometer; and

FIGURE 12 is an elevational plan view of the leaf switch utilized in the indicating and control circuits employed in conjunction with the flow meter; and FIGURE 13 is a sectional view taken substantially along the plane 13—13 of FIGURE 12.

Figure 3:
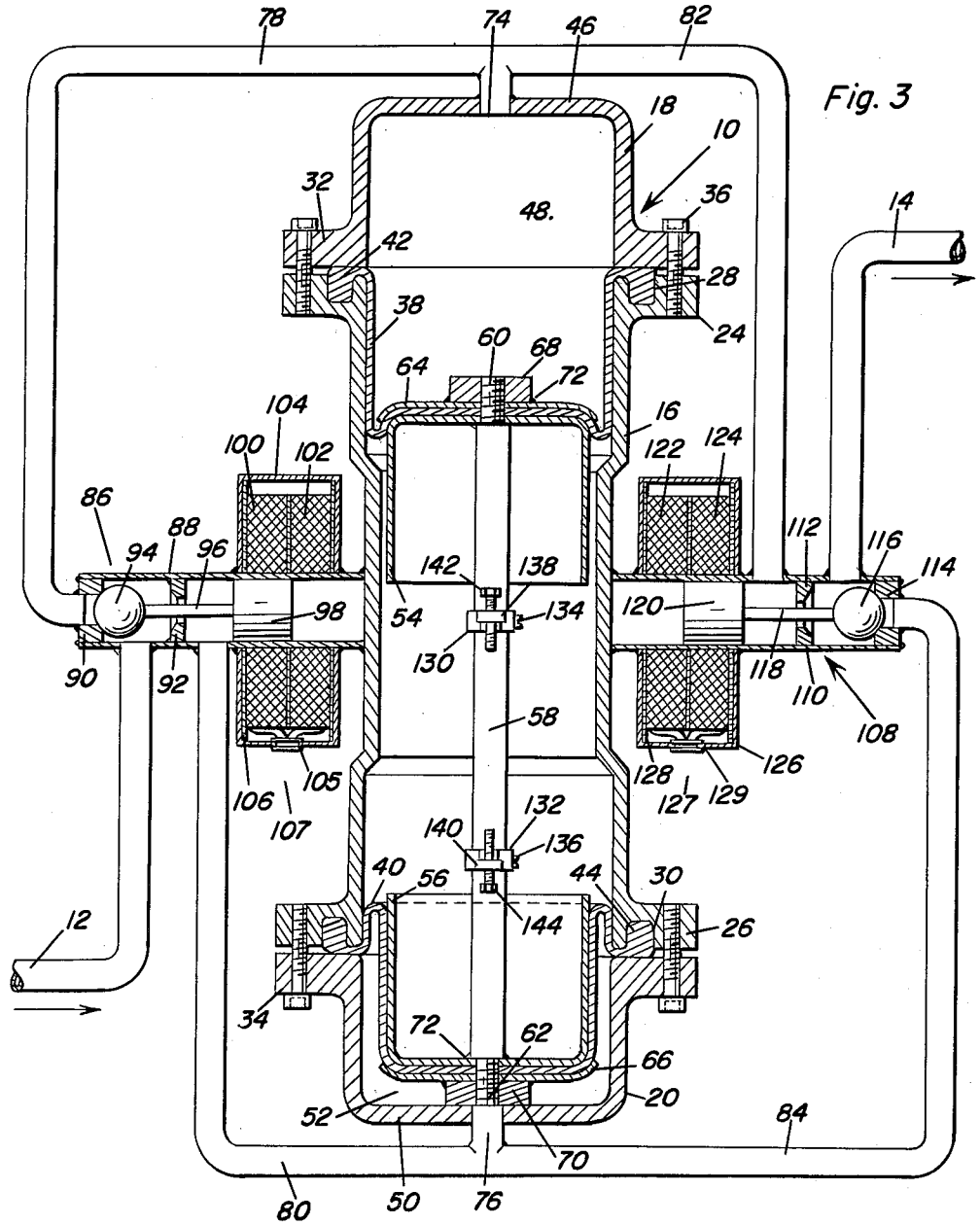
FIGURE 3 is an enlarged sectional view taken along the plane 3—3 of FIGURE 2 and particularly illustrates the internal details of the flow meter construction.

With continuing reference to the drawings and initial reference to FIGURES 1 to 3, the numeral 10 generally represents the flow meter comprising this invention and adapted to be connected between inlet pipe 12 and discharge pipe 14. It is contemplated, for example, that the inlet pipe 12 may be connected to a fuel pump or such, while the discharge pipe 14 may be connected to a carburetor or such. The flow meter 10 includes a housing having a central portion 16 and a pair of bonnet portions 18 and 20. The central portion 16 is substantially trough-shaped, being open along approximately half its surface as at 22. The central portion 16 has end flanges 24 and 26, each having an annular depression 28 and 30 therein for purposes to be more fully explained hereafter. The bonnet portions 18 and 20 include flanges 32 and 34 which are mated with the flanges 24 and 26 respectively. Bolts 36 are received through aligned apertures in the mating flanges to secure the bonnet portions 18 and 20 to the central portion 16 of the housing.

A pair of rolling sealing diaphragms 38 and 40 (of the type disclosed in U.S. Patent No. 2,849,026) have annular beaded end portions 42 and 44 respectively. The beaded portions 42 and 44 are received within the annular depressions 28 and 30 of the flanges 24 and 26 respectively. Of course, the bolts 36 which secure the respective flanges together retain the beaded portions 42 and 44 of the diaphragms 38 and 40 as particularly indicated in FIGURE 3. The diaphragm 38 in combination with the end wall 46 of the bonnet portion 18 forms a first meter chamber which may be designated generally as 48. The diaphragm 40 in combination with end wall 50 of bonnet 20 forms a second meter chamber which may generally be designated as 52.

A piston assembly is formed between a pair of hollow pistons 54 and 56 are positioned adjacent each of the diaphragms 38 and 40 remote from the chambers 48 and 52. A connecting rod 58 having threaded reduced end portions 60 and 62 passes through aligned apertures in the pistons 54 and 56 and the diaphragms 38 and 40. Repair plates 64 and 66 and nuts 68 and 70 are received on the threaded reduced end portions 60 and 62 of the connecting rods 58 to secure the pistons and diaphragms. Of course, appropriate sealing compound as indicated at 72 should be utilized where necessary.

Each of the chambers 48 and 52 have ports 74 and 76 respectively associated therewith which communicate with inlet tubes 78 and 80 respectively and discharge tubes 82 and 84 respectively. The piston assembly is therefore subject only to fluid displacing forces so that it will more sensitively respond to a small pressure differential between inlet and outlet of the meter by movements that are more nearly a linear function of the pressure differential and volumetric flow.

Inlet valve means through which inlet fluid is alternatively admitted to the meter chambers 48 and 52, is generally designated as 86 and includes an inlet valve casing 88 having a pair of inlet valve seats 90 and 92 interposed between inlet pipe 12 and the inlet tubes 78 and 80 respectively. An inlet valve member 94 carried by a first armature 96 is adapted to appropriately rest in either of the valve seats 90 and 92 to open or close either of the inlet tubes 78 or 80 from the inlet pipe 12. The casing 88 acts as a guide for a magnetic slug 98 terminally carried to the armature 96. The slug 98 is concentrically carried within a pair of electromagnetic coils 100 and 102 which are carried by the casing 88 within a container as 104. Insulating plates 106 are provided to appropriately insulate the electromagnetic coils 100 and 102. It will be observed that the inlet valve 86 in its illustrated position will admit fluid under pressure to chamber 52 for expansion thereof and simultaneously a fluid pressure bias to valve member 84 which will be available to prevent valve sticking and thereby insure instantaneous and positive actuation of valve 86 to its other position when coil 100 is deenergized at the end of the ensuing stroke of the connecting rod 58.

The discharge valve means generally designated as 108 is similar to the inlet valve means 86 in operation and simultaneously functions to alternatively admit fluid from meter chambers 48 and 52 to the outlet pipe 14. A casing 110 includes valve seats 112 and 114 therein and a discharge valve member 116 carried therebetween adapted to appropriately rest in either of the valve seats 112 or 114 to seal or open discharge tubes 82 or 84 relative to discharge pipe 14. The discharge valve member 116 is carried by a second armature 118 which has a magnetic slug 120 terminally fixed thereon adapted to slide within casing 110 acting as a guide therefor and which is also subject to a pressure bias as described in connection with valve 86. Electromagnetic coils 122 and 124 are carried by the casing 110 within a container 126 while appropriate insulating plates 128 are provided to adequately insulate the electromagnetic coils 122 and 124. Each of the containers 104 and 126 are supplied with rubber grommets 105 and 129 for passing the conductors 107 and 127 respectively.

A pair of collars 130 and 132 are adjustably carried on the connecting rod 58 and may be selectively positioned and retained by setscrews 134 and 136 respectively. The collars 130 and 132 carry bosses 138 and 140 respectively which have threaded apertures for threadedly accommodating screws 142 and 144 which are adjusted so as to prevent any control contact loading of the piston assembly during its movement between limit positions in accordance with the previously discussed objectives of subjecting the piston assembly to fluid displacing forces. The arrangement thus avoids the error-producing effects of variable mechanical resistance or other such influences on the movement of the piston assembly and the consequential effect on the volumetric variations in the meter chambers.

A unique snap action leaf switch 150 having an actuating leaf 152 is therefore positioned above the open trough area of the central portion 16 and is aligned with the screws 140 and 142 carried by the connecting rod 58 for sensitive response to the arrival of the piston assembly at its limit positions. The switch construction may be most easily seen in FIGURES 4, 12 and 13 and includes a pair of moving terminals 154 and 156 and fixed terminals 158, 160, 162 and 164. The moving terminals 154 and 156 are respectively carried by the flexible strip members 155 and 157. The actuating leaf 152 defines a substantially rectangular aperture 161 therein. A resilient element 159 extends parallel to the leaf 152 but is adapted to bend above and below the leaf 152 by bending through the aperture 161 in the two distinct switch positions. The terminals, resilient element and leaf are all terminally secured between a plurality of superposed insulators 169 retained together by bolts 163. An insulative cross member 165 receives and retains strip members 155 and 157 and tightly passes resilient element 159 therethrough. A C-shaped rolling spring 167 extends between the resilient element 159 and leaf 152 at the edge of the aperture 161. In operation, the leaf 152 is urged upwardly from the position illustrated in FIGURE 4 so that the spring 167 carries the resilient element 159 downwardly through the aperture 161. The downward movement of the resilient element 159 will be transferred through the cross member 165 to the strips 155 and 157 to move the movable terminals 154 and 156. The fixed contact 158 is connected to coils 100 and 124 while the fixed contact 160 is connected to coils 102 and 122. The movable contact 154 is electrically connected through conductor 166 to one side of an electrical energy source. Each of the coils 100, 102, 124 and 122 are connected to conductor 168 which is electrically connected to the other side of the electrical energy source. A coil 170 is provided between the fixed terminals 162 and 164 and the conductor 168. The movable terminal 156 is electrically connected to 166. It will be appreciated that with the switch in the position as illustrated in FIGURE 4, electromagnetic coils 100 and 124 will be energized while coils 102 and 122 will be de-energized. It will be seen by observing FIGURE 3, that the magnetic slugs 98 and 120 have been positively drawn into the magnetic field created by the energized coils 100 and 124. The valve members 94 and 116 carried by the armatures 96 and 118 fixed to the magnetic slugs are therefore seated in the valve seats 90 and 114. Assuming for the moment that the flow 10 is incorporated in a fuel flow system, the chamber 48 is now full of fuel. The fuel in chamber 48 may escape therefrom through the discharge tube 82, through valve seat 110 to the discharge pipe 14, as demanded by the carburetor. It will be noted that fuel may not flow through the port 74 and through the inlet tubes 78 because the valve member 94 has sealed the valve seat 90. However, the inlet tube 80 is open to the inlet pipe 12 and accordingly as the fuel flows from the chamber 48, it also flows from the pipe 12 through the inlet tube 80 and port 76 to the chamber 52 due to the pressure created by the fuel pump or such. In passing, it will be noted that discharge tube 84 is sealed by discharge valve member 116. It will be realized that in operation as chamber 48 empties, chamber 52 expands and connecting rod 58 carrying screws 142 and 144 reciprocates. The rolling seal diaphragms 38 and 40 provide substantially frictionless movement with virtually no stretching or deformity. As the screws 142 and 144 meet the leaf 152 of the switch 150 they will urge the leaf passed its dead center position. At this point the switch 150 due to the resiliency of the leaf 152 working in conjunction with the rolling spring 167, snaps contact 154 into contact with the fixed terminal 160 to de-energize the coils 100 and 124 and to energize the coils 102 and 122 to positively draw the magnetic slugs 98 and 120 to the alternative position (not shown in FIGURE 3). Accordingly, it will be realized that the chambers will alternatively be filled and vacated with a specific amount of liquid on each occasion. The coil 170 is a counter or metering coil which is adapted to be connected to a conventional counter for recording the respective number of movements of the connecting rod 58 so as to indicate the volume flow through the flow meter 10 by pulsing the counter once each stroke of the connecting rod. The counting or metering system as indicated by FIGURE 4 works highly efficiently, it being necessary however, to calibrate the counter utilized in conjunction with coil 170 or to multiply the number of movements or strokes of the connecting rod 58 by the respective capacities of the chambers 48 and 52, if the capacities of the chambers are some multiple of the units which it is desired to count. In order to automatically multiply the respective movements of the rod 58 by the correct conversion factor, it is contemplated that a system such as illustrated in FIGURE 6 may be used in conjunction with the system of FIGURE 4. A plurality of collars 172 are then secured to the rod 58 and may be adjustably retained thereon by setscrews 174. A switch 176 is provided and includes a resiliently mounted rolling actuator 178 adapted to bear against the connecting rod 58. As the connecting rod 58 makes its reciprocal passes, the collars 172 urge the actuator 178 upwardly to operate the reciprocal actuator 180 of the switch 176, as a micro-switch. A coil 182 may then be provided for pulsing the counter a number of times per stroke of the rod 58 as preset by the number of the collars 172 mounted thereon and it will not then be necessary to multiply the number of reciprocal passes of the rod 58 by a conversion factor corresponding to the capacity of the chamber to indicate the total flow through the flow meter.

Now particularly referring to the circuit of FIGURE 5, a dispensing control circuit generally designated at 184 is illustrated and includes conductors 186 and 188 connected to an electrical source of energy. A coin operated switch or a normally open momentary push button 190 is provided for completing a circuit through a relay coil 192 to either of terminals 162 or 164 through the movable terminal 156 to the source. The coil 192 operates normally open relay contacts 194 and 196. Accordingly, it will be seen that upon a momentary depression of push button 190, the relay contacts 196 will be closed and will remain closed because coil 192 will be energized therethrough. The coils and switch positions of FIGURE 5 have been made to correspond with the coils and switch positions of FIGURE 4. It will be noted that coil 170 has been removed in the circuit of FIGURE 5 and a short-circuit has been substituted therefor. In series with the normally open contacts 194 is a coil 198 of a normally closed two-way solenoid valve (not shown) of the conventional type. It will be seen that in the utilization of the control circuit of FIGURE 5, in order to dispense a particular amount of liquid, the total liquid contained in one chamber, the push button 190 may be depressed to open a shut-off valve (not shown) in the discharge pipe 14, as coil 198 becomes energized. Chamber 48 will therefore empty its contents into a discharge pipe 14 and the connecting rod 58 will move upwardly, from the position illustrated in FIGURE 3, as the chamber 52 fills. The screws 142 and 144 will then operate the leaf 152 of the switch 150 to move the movable terminals 156 and 154 to their lower position. The momentary break through the coil 192 as movable element 156 moves between fixed contacts 162 and 164 will open the circuit therethrough so as to open the normally open relay contacts 194 and 196 deenergizing the shut-off valve solenoid 198 for closing the discharge pipe 14 and holding the relay coil 192 deenergized to render the dispensing control circuit ready for another cycle initiated by depression of the start switch 190.

Attention is invited to the fragmentary view of FIGURE 7 wherein a rack 200 may be fixed to the connecting rod 58 for mesh with a pinion 202 fixed on a shaft 204 cooperating therewith for purposes of measuring the rate of flow through the meter 10 in addition to flow volume measurements effected through operation of the switch 150 by a volume recording system such as that of FIGURE 4 or a dispensing system such as that of FIGURE 5. It will be appreciated that upon reciprocal movement of the connecting rod 58, in accordance with the above, the rack 200 will reciprocate to rotate the shaft 204 fixed to pinion 202 engaged with the rack 200. In an initial utilization of the arrangement as is illustrated in FIGURE 7, the shaft 204 is connected to a tachometer generator which of course generates an output voltage proportional to the speed of reciprocation of the connecting rod 58. It will be apparent that since the movement of the connecting rod 58 is reciprocatory, the output voltage of the tachometer generator will constantly reverse its polarity. Accordingly, in FIGURE 8 a double-pole double-throw switch 206 by the actuator of the switch 150 for synchronized reversal of the generator output, is provided for correctively impressing the output voltage of the tachometer generator driven by the shaft 204 upon a meter 208. It will be appreciated that the meter 208 will reflect the output of the tachometer generator which will be proportional to the rate of movement of the connecting rod 58 which of course will be proportional to the flow rate through the flow meter 10. Therefore, by proper calibration the meter 208 will reflect the rate of flow through the flow meter 10 in gallons per hour.

Though the flow rate circuit of FIGURE 8 will operate for most purposes, it is well known to those skilled in the art that the output of a tachometer generator fluctuates at very low revolutions per minute. Accordingly, when extremely low flow rates are being measured, the flow rate circuit of FIGURE 9 may be used in conjunction with the FIGURE 8 arrangement wherein a direct current source 210 is connected across a potentiometer 212 having a wiper arm 214. Serially connected to the wiper arm 214 is a capacitor 216. Also referring to FIGURES 10 and 11, it is noted that the pinion 202 is connected through shaft 204 by a connector 218 to the wiper arm 214 of the potentiometer 212. It is well known that a capacitor will indicate the rate of change of voltage thereacross and so by varying the voltage impressed on the wiper arm 214, by the movement of the shaft 204, variations in voltage may be impressed on a capacitor 216. These of course, will be reflected in momentary current flows therethrough until the capacitor becomes charged. Accordingly, when the wiper arm 214 is in a particular position, no current will flow through the capacitor 216. However, as the voltage across the capacitor 216 tends to change, current is drawn therethrough and this current is impressed upon a resistor 220 connected in parallel with the meter 222 for indicating the voltage across the resistor 220. An appropriate double-pole double-throw switch 224 incorporated in switch 150 is serially interposed between the capacitor 216 and the resistor 220 to compensate for the reciprocatory movement of the connecting rod 58 so as to establish the desired polarity across the meter 222. It will be appreciated that the meter 222 will reflect the number of gallons per hour flowing through the flow meter 10.

It is to be noted that the switch 150 is unique and well adapted for its function in conjunction with the flow meter. The switch is always either closing one circuit or the other (disregarding the rapid, momentary transfer time) and there is no neutral, dead center position where the switch may come to rest so that it is engaged only at the end limit positions of the pistons wherein movement reverses thus operating as a position sensing control for the valves without imposing a movement retarding influence on the pistons during fluid displacing movement. If there was such a dead center position, the flow meter would stop functioning. The transfer speed of the switch is fast enough so that fluctuations do not appear on a meter used in conjunction with the potentiometer or tachometer generator, but slow enough to operate a counter. The rolling spring forces the switch to snap forwardly to make contact rather than just to wipe across terminals for contact. Since the switch is easily adapted for ganging, many circuits may be controlled by a single leaf actuator without the necessity of synchronization.

From the foregoing, it is thought that the operation, utilization, and potentialities of the flow meter will be apparent. The rolling action of the diaphragm, instead of conventional flexing action, enables the achievement of the significantly accurate flow meter. By utilizing positively drawn inlet and discharge valve means, the flow meter is particularly suited for mobile use since it is not affected by vibration and jarring and it may be utilized in any position. No lubrication of the various portions of the invention are necessary and the relative simplicity of the device makes it apparently economical to manufacture. Further, since there are no sliding valves used, there is no problem of sticking due to foreign materials present within the liquid flow usually operative to impose error producing effects on piston displacement. Also, there are no sliding metal to metal seals to wear which can cause errors in the calibration due to fluid bypass. The versatility of the bosses carried by the connecting rod 58 enable the flow meter to be utilized with a plurality of standard meters as desired. It is also to be noted that since the amount of liquid being exhausted is always equal to the amount of liquid entering, the volumetric efficiency is 100%. If desirable, by connecting the pinion 202 to a motor, the connecting rod 58 may be driven so that the flow meter may be operated as a very efficient positive displacement pump which may also register the amount of liquid pumped.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A flow meter construction for accurately metering liquid flow comprising a housing having a pair of opposed end walls, a rolling seal diaphragm retained proximate each of said end walls and spaced therefrom, chambers defined between each of said end walls and the diaphragm spaced proximately therefrom, a single acting piston fixed to each of said diaphragms, an unsupported connecting rod connecting said pistons, a single port associated with each chamber, inlet and discharge tubes communicating with each port and separate pressure biased valve means for controlling flow to and from said inlet and discharge tubes, an inlet pipe, each of said inlet tubes being positioned adjacent said inlet pipe, said valve means including an inlet valve seat interposed between each inlet tube and said inlet pipe, an inlet valve member movable between said inlet valve seats, an armature attached to said inlet valve member, a pair of electromagnetic coils, said electromagnetic coils positioned adjacent said armature for positively drawing said armature between two distinct positions, each of said distinct positions causing the inlet valve member carried by the armature to properly rest in an inlet valve seat, a source of electrical energy, switch means electrically interposed between said source and said electromagnetic coils for alternatively connecting said coils to said source, and snap-action control means for operating said switch means in response to reciprocation of said connecting rod, said snap-action control means including adjustable elements carried by said connecting rod, said connecting rod being subjected to reciprocal movement dependent on the flow required from said discharge pipe.

2. A flow meter construction for accurately metering liquid flow comprising a housing having a pair of opposed end walls, a rolling seal diaphragm retained proximate each of said end walls and spaced therefrom, chambers defined between each of said end walls and the diaphragm spaced proximately therefrom, a single acting piston fixed to each of said diaphragms, an unsupported connecting rod connecting said pistons, a single port associated with each chamber, inlet and discharge tubes communicating with each port and separate pressure biased valve means for controlling flow to and from said inlet and discharge tubes, an inlet pipe, each of said inlet tubes positioned adjacent said inlet pipe, said valve means including an inlet valve seat interposed between each inlet tube and said inlet pipe, an inlet valve member movable between said inlet valve seats, a discharge pipe, each of said discharge tubes being positioned adjacent said discharge pipe, said valve means further including a discharge valve seat interposed between each discharge tube and said discharge pipe, a discharge valve member movable between said discharge valve seats, a first armature attached to said inlet member, a first pair of electromagnetic coils, said first pair of coils positioned adjacent said first armature for positively drawing said first armature between two distinct positions, each of said two distinct positions of said first armature causing the inlet valve member carried by the first armature to properly rest in an inlet valve seat, a second armature attached to said discharge valve member, a second pair of electromagnetic coils, said second pair of electromagnetic coils positioned adjacent said second armature for positively drawing said second armature between two distinct positions, each of said two distinct positions causing the discharge valve member carried by the second armature to properly rest in a discharge valve seat, a source of electrical energy, switch means electrically interposed between said source and said electromagnetic coils for connecting said coils to said source, and snap-action control means for operating said switch means.

3. The combination of claim 2 wherein said snap-action control means includes adjustable elements carried by said connecting rod, said connecting rod being subjected to reciprocal movement dependent on the flow required from said discharge pipe.

4. A flow meter construction for accurately metering liquid flow comprising a housing having a pair of opposed end walls, a rolling seal diaphragm retained proximate each of said end walls and spaced therefrom, chambers defined between each of said end walls and the diaphragm spaced proximately therefrom, a single acting piston fixed to each of said diaphragms, an unsupported connecting rod connecting said pistons, a single port associated with each chamber, inlet and discharge tubes communicating with each port, separate pressure biased valve means for controlling flow to and from said inlet and discharge tubes, and a counting circuit for indicating the number of reciprocal movements of said connecting rod including a switch, a pair of adjustable bosses carried by said connecting rod, said switch positioned in the path of said bosses for contact thereby during movement of said rod and a counting coil energizable through said switch.

5. A flow meter construction for accurately metering liquid flow comprising a housing having a pair of opposed end walls, a rolling seal diaphragm retained proximate each of said end walls and spaced therefrom, chambers defined between each of said end walls and the diaphragm spaced proximately therefrom, a single acting piston fixed to each of said diaphragms, an unsupported connecting rod connecting said pistons, a single port associated with each chamber, inlet and discharge tubes communicating with each port, separate pressure biased valve means for controlling flow to and from said inlet and discharge tubes, and a counting circuit for indicating the movement of said connecting rod comprising a switch, a resiliently mounted rolling actuator operatively associated with switch, a plurality of spaced cams on said connecting rod, said actuator resiliently bearing against said rod for actuation by said cams.

6. In combination with the flow meter of claim 2, a tachometer generator, said generator being driven by said connecting rod and a meter operatively connected by said switch means to said generator for indicating the output thereof.

7. A flow meter construction for accurately metering liquid flow comprising a housing having a pair of opposed end walls, a rolling seal diaphragm retained proximate each of said end walls and spaced therefrom, chambers defined between each of said end walls and the diaphragm spaced proximately therefrom, a single acting piston fixed to each of said diaphragms, an unsupported connecting rod connecting said pistons, a single port associated with each chamber, inlet and discharge tubes communicating with each port, separate pressure bias valve means for controlling flow to and from said inlet and discharge tubes, a rack attached to said connecting rod, a pinion driven by said rack and having a shaft fixed thereto, a potentiometer having a wiper arm, said potentiometer being connected across a direct current source, said wiper arm driven by said shaft, a capacitor electrically connected in series with said wiper arm, and a meter for indicating the current through said capacitor.

8. A flow meter comprising, casing means, expansible metering chamber means formed within said casing means, reciprocable piston means movably connected to the casing means for movement between limit positions and subject only to fluid displacing forces of fluid in the metering chamber means for linear volumetric expansion and contraction of the metering chamber means, fluid inlet means operatively connected to said metering chamber means rendered operative to supply thereto a predetermined metered volume of fluid under inlet pressure, fluid outlet means operatively connected to said inlet means and the metering chamber means and rendered operative for pressure synchronizing movement of the piston means between said limit positions for constant flow of fluid from the metering chamber means, snap-action control means operatively connected to said fluid inlet means and the fluid outlet means for rendering thereof operative in response to engagement by the piston means only at the limit positions thereof, whereby variable mechanical resistance to movement and error producing displacement of the piston means is avoided, and speed responsive means operatively connected to the piston means and the snap-action control means and flow rate indicating means operatively connected to the speed responsive means, said speed responsive means includes a reversing source of current operatively connected to the piston means to supply an alternating current having a cycle frequency in accordance with that of the piston means and a voltage proportional to the reciprocating speed thereof, reversing switch means operatively connected to said reversing current source and the snap-action control means for producing a unidirectional current, said flow rate indicating means including voltage measuring means operatively connected to said reversing switch means.

9. The combination of claim 8 wherein said reversing source of current includes a constant voltage source, variable resistor means operatively connected to said constant voltage source and piston means to produce a variable voltage output and capacitor means operatively connecting said variable resistor means to the reversing switch means for supplying said reversing current at a voltage proportional to the reciprocatory speed of the piston means.

10. A flow meter comprising, casing means, expansible metering chamber means formed within said casing means, reciprocable piston means movably connected to the casing means for movement between limit positions and subject only to fluid displacing forces of fluid in the metering chamber means for linear volumetric expansion and contraction of the metering chamber means, fluid inlet means operatively connected to said metering chamber means rendered operative to supply thereto a predetermined metered volume of fluid under inlet pressure, fluid outlet means operatively connected to said inlet means and the metering chamber means and rendered operative for pressure synchronizing movement of the piston means between said limit position for constant flow of fluid from the metering chamber means, snap-action control means operatively connected to said fluid inlet means and the fluid outlet means for rendering thereof operative in response to engagement by the piston means only at the limit positions thereof, whereby variable mechanical resistance to movement and error producing displacement of the piston means is avoided, meter indicating means operatively connected to the snap-action control means and the piston means for determining the volume and flow rate of fluid passing through the flow meter, said meter indicating means including counter means operatively connected to the snap action control means and pulsed therethrough in response to each reciprocatory stroke of the piston means for indicating fluid volume, and speed responsive means operatively connected to the piston means and the snap-action control means for measuring the flow rate of fluid, said speed responsive means including a reversing source of current operatively connected to the piston means to supply an alternating current having a cycle frequency in accordance with that of the piston means and a voltage proportional to the reciprocatory speed thereof, reversing switch means operatively connected to said reversing current source and snap-action control means for producing a unidirectional current, and voltage measuring means operatively connected to said reversing switch means.

11. The combination of claim 10 wherein said reversing source of current includes a constant voltage source, variable resistor means operatively connected to said constant voltage source and piston means to produce a variable voltage output and capacitor means operatively connecting said variable resistor means to the reversing switch means for supplying said reversing current at a voltage proportional to the reciprocatory speed of the piston means.

12. A flow meter comprising, casing means, expansible metering chamber means formed within said casing means, reciprocable piston means movably connected to the casing means for movement between limit positions and subject only to fluid displacing forces of fluid in the metering chamber means for linear volumetric expansion and contraction of the metering chamber means, fluid inlet means operatively connected to said metering chamber means rendered operative to supply thereto a predetermined metered volume of fluid under inlet pressure, fluid outlet means operatively connected to said inlet means and metering chamber means and rendered operative for pressure synchronizing movement of the piston means between limit positions for constant flow of fluid from the metering chamber means and snap-action control means operatively connected to said fluid inlet means and fluid outlet means for rendering thereof operative in response to engagement by the piston means only at the limit positions thereof, whereby variable mechanical resistance to movement and error producing displacement of the piston means is avoided, a reversing source of current operatively connected to the piston means to supply an alternating current having a cycle frequency in accordance with that of the piston means and a voltage proportional to the reciprocatory speed thereof, reversing switch means operatively connected to said reversing current source and snap-action control means for producing a unidirectional current, voltage measuring means operatively connected to said reversing switch means, said source of reversing current comprising generator means drivingly connected to said piston means.

13. A flow meter comprising, metering chamber means, piston means non-frictionally guided in sealing relation within the chamber means for volumetric displacement of measured fluid as a linear function of pressure differential acting on said piston means, conduit means operatively connected to said chamber means to supply unmeasured fluid to said chamber means simultaneously with the discharge of said measured fluid therefrom for maintaining said pressure differential on the piston means, fluid directing valve means operatively connected to said conduit means and held in any position thereof by said pressure differential to directionally maintain said supply and discharge of fluid to and from the chamber means, stroke sensing means operatively connected to said valve means for displacement thereof in response to directional change in movement of the piston means to directionally change said supply and discharge of fluid for maintaining a continuous flow of unmeasured fluid, and speed sensing means operatively connected to the piston means to measure rate of displacement thereof, and flow rate indicating means directionally controlled by said stroke sensing means and operatively connected to said speed sensing means for measuring said continuous flow of fluid.

14. The combination of claim 13 wherein said stroke sensing means comprises, limit switch means actuated by said piston means upon directional change in movement thereof, a source of electrical potential connected to said switch means for producing control signal pulses in response to actuation of said switch means and electromagnetic means responsive to said control signal pulses for displacing said valve means against the bias of said pressure differential.

References Cited in the file of this patent
UNITED STATES PATENTS

| | | |
|---|---|---|
| 20,169 | Perrine | May 4, 1858 |
| 1,470,381 | Lamb | Oct. 9, 1923 |
| 2,186,307 | Polko | Jan. 9, 1940 |
| 2,237,705 | Kohl | Apr. 8, 1941 |
| 2,265,508 | Blum | Dec. 9, 1941 |
| 2,265,842 | Kellogg | Dec. 9, 1941 |
| 2,529,481 | Brewer | Nov. 14, 1950 |
| 2,581,705 | Richie | Jan. 8, 1952 |
| 2,612,778 | Hubbard | Oct. 7, 1952 |
| 2,663,770 | Cox | Dec. 22, 1953 |
| 2,692,500 | Muhlner | Oct. 26, 1954 |
| 2,820,434 | Otto | Jan. 21, 1958 |
| 2,887,249 | Smithwick et al. | May 19, 1959 |